Figure 1:
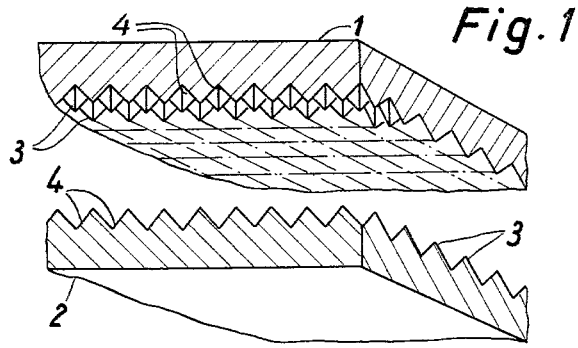

Nov. 23, 1965        E. REINERT        3,219,742
METHOD OF WELDING FAST TOGETHER OBJECTS OR SHAPED
PARTS OF THERMOPLASTIC MATERIALS
Filed Sept. 10, 1962        2 Sheets-Sheet 1

Nov. 23, 1965  E. REINERT  3,219,742
METHOD OF WELDING FAST TOGETHER OBJECTS OR SHAPED
PARTS OF THERMOPLASTIC MATERIALS
Filed Sept. 10, 1962  2 Sheets-Sheet 2

United States Patent Office 3,219,742
Patented Nov. 23, 1965

3,219,742
METHOD OF WELDING FAST TOGETHER OBJECTS OR SHAPED PARTS OF THERMOPLASTIC MATERIALS
Ernst Reinert, Bredenbeck uber Hannover, Germany, assignor to Dr. Ing., Funck K.G., Munich-Pasing, Germany
Filed Sept. 10, 1962, Ser. No. 222,344
Claims priority, application Germany, Sept. 14, 1961,
F 34,928
1 Claim. (Cl. 264—248)

This invention relates to a method of welding fast together objects or shaped parts of thermoplastic material in which the weld surfaces of the objects to be joined together are first melted by external supply of heat in the region of a surface layer and the intimate connection is then made by firmly pressing the weld surfaces on to one another.

In the welding of objects or shaped parts of thermoplastic material, which are generally of relatively great thickness and during the welding operation should as far as possible retain their shape, the heat necessary for melting the surface layers is supplied to the weld surfaces by direct contact with heating wedges, by heat radiation, or by blowing hot gases on to the surfaces.

The usual thermoplastic materials are relatively poor conductors of heat and consequently the heat supplied from outside penetrates only slowly from the directly heated surface into the deeper layers of the material lying beneath the surface. In order to obtain firm welds, the surface layers on both weld surfaces must however be brought into a molten condition to a certain depth in order that an adequate amount of molten plastic material is available to provide an intimate connection when the parts are pressed against one another. Since the plastic material on the outer surfaces may not in any circumstances be heated or "burnt" beyond its decomposition temperature by an excessive supply of heat, the permissible supply of heat to the weld surfaces is limited and the faultless melting of the material to the necessary depth presents great difficulties.

The aim of the present invention is to obviate these difficulties and to improve the melting of the layers lying beneath the surface of the weld surfaces to be joined together, in order thereby to increase the strength of the weld joint and possibly also to reduce the time necessary for melting, on which the total time of the welding operation is dependent.

By the method according to the invention for firmly welding together objects or shaped parts of thermoplastic material, the melting of the quantity of material necessary for the welding or the penetration of the melting heat into the deeper surface layers of the thermoplastic material is considerably improved by providing at least one of the weld surfaces with projections and/or depressions which enlarge its surface and which preferably lie close against one another, before the surface layer is melted and the objects pressed against one another.

Whereas with at least approximately uniform distribution of the heat supplied over the smooth surface and the maintenance of a maximum permissible surface temperature only a limited amount of heat can be supplied per unit of time to a flat weld surface and transmitted into the deeper layers, through the enlargement of the surface according to the invention which is achieved by providing protuberances and/or depressions in the said surface, the amount of heat supplied in the same period of time cannot only be substantially increased but also brought more quickly to the material contained in the deeper layers, without bringing about an impermissible or at least undesirable overheating of the material at the outer surfaces.

In the case of plastic objects or shaped parts both of which consist of the same plastic material and accordingly have the same hardness and the same softening point, it is convenient to provide the two weld surfaces to be joined together with a regular network of projections and/or depressions produced for example by stamping or rolling. However, it is also possible to form parallel ribs and/or grooves on both surfaces, and this is particularly simple in the case of extruded parts.

When objects or shaped parts of thermoplastic materials of fundamentally the same type but different hardness are to be welded together, for example, an object having a low plasticiser content and another object having a higher plasticiser content, it is generally convenient for only the weld surface of the object made of harder plastic, which is consequently more difficult to melt, to be provided with the projections and/or depressions enlarging the surface. In this way the effect can be achieved that an adequately large quantity of material melts on the surface of the harder plastic in the same period of time as is necessary for melting a corresponding amount of material on the object of softer plastic.

The effect of the projections and depressions or of the ribs and grooves on one or both weld surfaces is different depending on the type of heat supply.

If for the purpose of melting the platsic material contained in the surface layers of the weld surfaces use is made of a known heating wedge or similar heating body supplying the heat mainly by direct contact, the weld surfaces being for example pressed against it on both sides, contact with this heating wedge first melts those quantities of plastic material which are situated in the outer tips or edges of the projections of the weld surface; the material thus melted is pressed sideways into the neighbouring depressions while the heating wedge continually comes into pressure contact with new plastic material of deeper layers and also rapidly melts these layers. Within a relatively short period of time the material of the outer parts of the projections is carried or pressed away in the molten condition and then completely fills the neighbouring depressions. In this case therefore the acceleration of the melting is based on the pressing away of the material which has just been melted and the consequent continuous exposure of plastic material which is not yet melted. By moving the contact heater in relation to the weld surfaces the effect, particularly the transfer of the molten plastic material to the depressions, can be further increased.

With a smooth weld surface, such as has been customary hitherto, this action does not occur because, apart from a narrow edge zone, the surface material melted by the heating wedge cannot be pressed away in order to expose deeper layers of synthetic plastic.

If the heat is supplied to the weld surfaces by radiation heaters or hot gases, the projections and/or depressions on the weld surfaces act essentially through the enlargement of the outer surface; through the heat radiation or through the hot gas which is advantageously mainly blown into the depressions in the weld surfaces at right angles to the latter, the surface parts lying at a greater depth are also acted on and it is sufficient to melt a thinner surface layer in order to bring the same quantity of plastic into the weldable condition as if the surface were completely flat.

In this case the projections and/or depressions first remain approximately in their original shape; their surfaces are however melted to a determined layer depth so that during the subsequent pressing together of the weld surfaces the molten material of both surfaces can be pressed one into the other in such a manner that a firm and compact weld joint is formed.

With plastics of different hardnesses, the distribution of the heat can be adjusted by correspondingly different distances between the heating elements and the weld surfaces to be heated to the magnitude required in each particular case; if the distance from the harder plastic is made smaller than the distance from the softer plastic, the harder material will receive in the same period of time the greater amount of heat required.

A special field of application of the method according to the invention is in the production of footwear having outer soles of a plasticised thermoplastic material, for example polyvinylchloride, which are fastened to the uppers by means of a frame previously fastened on the upper and running therearound, this frame in turn consisting of a substantially harder thermoplastic material of the same type. The frame is surface-welded to an edge zone of the sole.

It has been found that when using a frame profile which on its underside forming the weld surface has parallel ribs lying close side by side, it is not only possible to shorten the time required for making the weld joint but above all the durability of the weld joint between the plastic parts of different hardnesses is improved. Since the plastic frames for making the abovementioned footwear are extruded as endless frame sections, with a frame section of this type the ribs provided on the underside of the frame all run in the longitudinal direction and close side by side in the region of the weld surface of the frame.

The height of the projections or ribs or the depth of the depressions is advantageously selected at about 0.3 to 1.5 mm.; in the case of parts of small dimensions, such as for example frame sections for footwear, the figure is about 0.5 mm.

It should further be pointed out that the enlargement of the surface by projections and/or depressions such as is effected according to the invention in objects of thermoplastic material to be welded together for the purpose of improving the melting of relatively thick surface layers, has nothing to do with the known roughening of surfaces which are to be bonded together. In the case of surfaces to be bonded together the roughening merely serves the purpose of improving the adhesion of the adhesive to the roughened surface. This roughening is retained during the bonding operation, whereas according to the present invention the projections and/or depressions melt at the latest during the welding operation to form a uniform mixed zone, that is to say they cease to exist.

Figure 2:
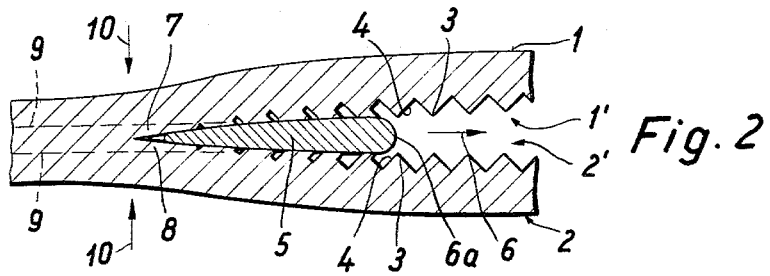
Figure 3:
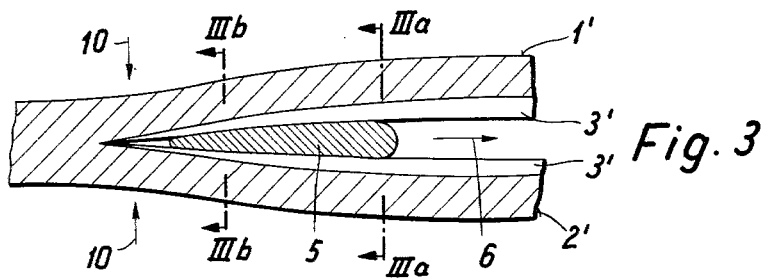
Figure 3A:
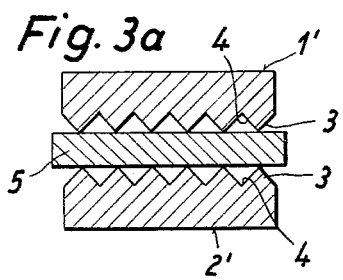
Figure 3B:
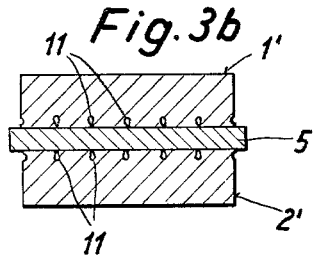
Figure 4:
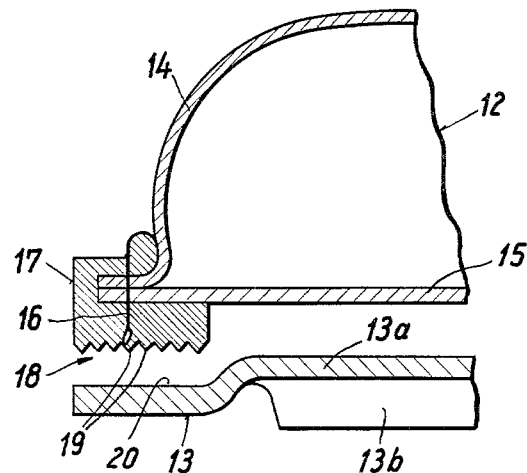
Figure 5:
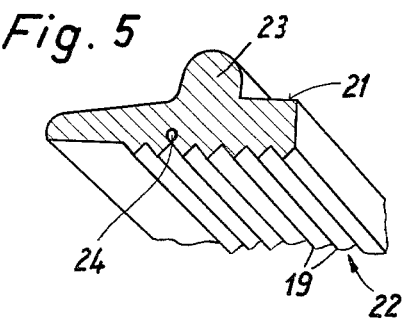

In order to explain the method according to the invention more fully, some examples of its application are illustrated in the accompanying drawings, in which:

FIGURE 1 shows two pieces of the same type of thermoplastic material which are to be welded together after melting the surface layers of their weld surfaces facing one another, FIGURE 2 illustrates diagrammatically the welding operation in which the mutually facing surface layers of the two plastic pieces shown in FIGURE 1 are melted at their welding surfaces by the use of a known heating wedge and then firmly pressed together, FIGURE 3 illustrates similarly to FIGURE 2 the welding of two band-like plastic sections provided with parallel ribs, FIGURES 3a and 3b show vertical cross-sections along the sectional lines IIIa—IIIa and IIIb—IIIb in FIGURE 3, FIGURE 4 a vertical section through a part of a shoe upper with plastic frame and a plastic outer sole to be fastened to the frame of the upper by welding, and FIGURE 5 shows a perspective view seen obliquely from below of a portion of a plastic frame the profile shape of which varies from that of the frame illustrated in FIGURE 4.

The two pieces 1 and 2 of the same type of thermoplastic material which are illustrated in FIGURE 1 are to be joined fast together by their mutually facing weld surfaces by welding. Surface welding of this type requires the melting of a surface layer to a certain depth in order that when the weld surfaces are afterwards pressed together the plastic material of the molten layers can flow intimately one into the other.

The heating of the weld surfaces can be effected in any desired manner by the external supply of heat to these surfaces, for example by means of a radiation heater introduced between the two plastic pieces 1 and 2, the said heater giving up radiant heat on both sides and correspondingly heating the surfaces held at a distance from the heater; a hot gas may also be introduced between the surfaces which by convection will transmit to these surfaces the heat necessary for melting them.

In order to increase the absorptive capacity for heat of the two welding surfaces, to promote the introduction of heat into the regions of the surface layers lying below the surface and thus to shorten the heating time, the mutually facing weld surfaces are provided with projections 3 and depressions 4 which greatly increase the total surface of the welding surfaces.

In the exemplary embodiment illustrated, the projections 3 are pyramidal protuberances produced by pressing or rolling; between these protuberances lies corresponding depressions 4 in the form of grooves crossing one another. The projections 3 are disposed in accordance with a uniform network pattern and, if the pyramid side surfaces are inclined at about 45° in relation to the middle plane of the welding surface, a surface enlargement of about 40% is obtained.

With equal thermal transmission loading of the surface, the amount of heat supplied to the welding surfaces by radiation or hot air can thus be increased by about 40%, so that the heating time is correspondingly shortened and thus the melting of the quantity of material of the surface layer required for perfect welding in each case is accelerated.

It is further seen from the description relating to FIGURE 1 that part of the heat supplied, which is transferred to the plastic material between the protuberances 3 in the region of the depressions 4 penetrates direct into the deeper layers of the plastic pieces 1 and 2. This applies both to heat transmission by radiation and to heat transmission by hot gases, which are blown substantially perpendicularly to the welding surfaces carrying the network of protuberances; in the latter case another advantageous effect is achieved by the fact that the flow of gas is incited by the projections to form eddies, whereby as is well-known, an increase of the heat transmission is achieved.

FIGURE 2 illustrates the welding of the two plastic parts 1 and 2 illustrated in FIGURE 1 with the aid of a known heating wedge 5 which is passed through, preferably continuously, between the two welding surfaces 1' and 2', which are provided with projections, of the parts 1 and 2. The direction of the relative movement of the heating wedge in relation to the plastic parts is shown by the arrow 6. At the run-up side 6a of the heating wedge, which is slightly rounded, the pyramidal projections 3 first make contact with the hot heating wedge surface by their apices, which are thus quickly melted. On being further moved over the heating wedge surface, the apices of the pyramidal protuberances are carried away more and more in the molten condition and the molten material carried away is moved into the gaps or depressions 4 between the pyramidal protuberances. On the run-down side of the heating wedge so much material has been carried away from the protuberances that the gaps lying between the latter are completely filled with molten material. Since larger amounts of heat also pass into the plastic material on the surfaces from which material has been moved, a plastic surface layer 7 and 8 respectively is melted, to a great extent uniformly, behind the heating wedge on each of the two parts 1 and 2, the thickness thereof being approxmiately equal to half the original height of the protuberances; when the two parts are firmly pressed together in the direction of the arrows 10, the firm and intimate welding connection is then made through these layers.

In the welding layer illustrated by broken bounding lines 9, the molten surface layers 7, 8 of the two parts have flown completely into one another. In the case of two completely identical plastic mixtures in the parts 1 and 2, the plastic materials flow into one another in such a way that inside the welding layer it can afterwards no longer be discovered how the materials flowed into one another.

FIGURES 3, 3a, and 3b illustrate one example of the welding of two plastic strips 1', 2', which on their surfaces facing one another (the weld surfaces) are provided with parallel longitudinal ribs 3' lying close side by side and of triangular profile. In this case the heat is transmitted from the heating wedge 5 to the plastic material fundamentally in the same manner as has been described in connection with the embodiment illustrated in FIGURE 2. The difference consists merely in that the heating wedge 5 presses towards both sides into the depressions 4' lying between the ribs the plastic material which has been melted at the outer edges of the ribs 3', until the said depressions are practically filled. Comparison of FIGURES 3a and 3b shows that when continuous parallel ribs are used material is also carried away to approximately half the height of the ribs and thus new plastic layers are continually brought into contact with the surface of the heating wedge.

On the compression of the two plastic strips behind the heating wedge, the gaps or hollows 11 which can be seen in FIGURE 3b, and the surfaces of which have previously been heated by radiation heat emanating from the heating wedge, are also completely closed.

It should be clear that in the welding operations such as are illustrated in FIGURES 2 to 3b, it is also possible to use, instead of the heating wedges, radiation heaters or a hot gas blown on to the weld surfaces for the purpose of melting the plastic material in the surface layers in the region of the weld surfaces. In this case not only the projections but also the depressions are intensely heated.

The flowing of the molten plastic layers into one another is promoted when the parts are subsequently pressed against one another by the fact that the projections are largely melted, and are intensely deformed when they encounter one another, that the molten plastic masses slide one into the other and thus mix intimately with one another while the outer surface layers are disrupted. This destruction of the original surface layers is found to be particularly favourable in respect of the strength of the resulting weld joint.

Finally, it should also be pointed out that through the increase of the surface of the weld surfaces which remains in existence at least approximately until the plastic parts are pressed against one another in the case of radiation and hot gas heating, the surfaces of the plastic part which are welded to one another are also increased so that the weld seam for this reason alone has greater strength than when the welding occurs only between two completely flat surfaces.

This advantage is also particularly effective when plastic mixtures having constituents which cannot be welded to one another, such as plasticisers or fillers, have to be welded together. In this case owing to the enlargement of the surface, as compared with flat weld surfaces, the effect is achieved that more fully weldable particles or molecules of the plastic forming the basis of the mixtures come into intimate welding contact with one another and thus the total strength of the weld seam is increased approximately in proportion to the increased surface.

FIGURE 4 illustrates an example of the performance of the method according to the invention, in which two shaped parts of synthetic thermoplastic materials of fundamentally the same type but of different hardness are to be welded together, while for the purpose of obtaining the desired advantages it is sufficient for only the part made of the harder plastic to be provided in the region of its weld surface with the surface-enlarging protuberances or depressions.

FIGURE 4 shows a partial vertical cross-section through the front part of a shoe upper 12 and of the outer sole 13 to be joined to the said upper. The upper leather 14 and the inner sole 15 are fastened together by a seam 16 running approximately vertically in the U-shaped frame 17. The frame 17, which is extruded in an intrinsically known manner as a straight "endless" section of polyvinylchloride having a low plasticiser content, has at its underside 18 ribs 19 running parallel to one another and lying close side by side. The outer sole 13 of the shoe to be joined to the frame consists of plasticised polyvinylchloride which has a lower melting point than the material of the frame 17. In its middle portion 13a the sole is arched upwards and provided on the underside of the curvature with supporting profiles 13b.

For the purpose of making the weld between the edge zone weld surface 20 on the upper side of the sole 13 and the weld surface 18 which is equipped with ribs 19 and is provided on the lower side of the frame 17, either a heating wedge is passed through between the weld surfaces, as has been described with reference to FIGURE 2, or the weld surfaces are heated by a radiant heater disposed between the latter with clearance on both sides, or else by a heating gas which is blown on to the weld surfaces.

The ribs 19 on the lower side 18 of the relatively hard frame 17 in all three cases effect the heating in such a manner that the material of the weld surface of the frame is melted exactly as quickly to a certain depth as the material on the smooth weld surface 20 of the sole 13. After the heating, the sole and frame are pressed firmly against one another whereby the intimate welding is effected. In the case of heating wedge welding, this is preferably effected continuously as the heating wedge progresses around the periphery of the shoe; with the two other methods of heating the welding surfaces can if desired be heated simultaneously over the entire periphery so that the pressing together of the shoe upper and the sole, after removal of the heating device, can likewise be effected simultaneously on the entire periphery.

The construction of the plastic frame having surface-enlarging protuberances and/or depressions provided closely side by side on its underside, particularly parallel ribs, is new in relation to the known state of the art and, as explained above, has an advantageous technical effect since it permits the speeding up of the welding operation.

In FIGURE 5 a portion of a shoe frame 21 of different shape is shown separately; this figure shows particularly clearly the arrangement of the parallel ribs 19 on the underside of the frame. This frame profile which is known per se, for example as used for frame footwear of the Goodyear-type, is provided with the ribs 19, only in the outer zone 22 of its lower side, since the welding to the corresponding edge zone on the upper side of the outer sole is effected only in this edge zone. The bead rib 23 on the upper side is intended for the external supporting of the upper, the edge of which together with the inner sole is joined fast to the frame by a seam sunk in the groove 24.

What I claim is:

A method of welding fast together objects of a thermoplastic material, comprising the steps of forming at least one of the weld surfaces with projections defining depressions therebetween and enlarging the surface thereof, positioning a heater between the weld surfaces for supplying the melting heat by direct contact for melting the surface layer of the weld surfaces, moving the heater in relation to the weld surfaces so that the plastic material melted on the projections is carried away and transferred into the neighboring depressions, and firmly pressing the weld surfaces against one another for intimately connecting the weld surfaces.

References Cited by the Examiner

UNITED STATES PATENTS

| 2,367,725 | 1/1945 | Lindh et al. | |
|---|---|---|---|
| 2,387,566 | 10/1945 | Custers | 156—499 |
| 2,914,438 | 11/1959 | Sandt et al. | 156—153 |

OTHER REFERENCES

J. H. Perry: Chemical Engineers' Handbook, pp. 465 and 489 relied on, 3rd edition, 1950.

ROBERT F. WHITE, *Primary Examiner.*

ALEXANDER H. BRODMERKEL, *Examiner.*